(12) United States Patent
Okawa et al.

(10) Patent No.: US 7,122,272 B2
(45) Date of Patent: Oct. 17, 2006

(54) NON-AQUEOUS ELECTROLYTE SECONDARY CELL WITH A LITHIUM METAL PHOSPHATE CATHODE

(75) Inventors: Tsuyoshi Okawa, Fukushima (JP); Mamoru Hosoya, Kanagawa (JP); Junji Kuyama, Kanagawa (JP); Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/972,375

(22) Filed: Oct. 5, 2001

(65) Prior Publication Data

US 2002/0106563 A1 Aug. 8, 2002

(30) Foreign Application Priority Data

Oct. 6, 2000 (JP) .......................... P2000-308302

(51) Int. Cl.
*H01M 10/02* (2006.01)
*H01M 4/52* (2006.01)
(52) U.S. Cl. .................. 429/122; 429/221; 429/231.95
(58) Field of Classification Search ................ 429/221, 429/231.95, 122
See application file for complete search history.

(56) References Cited

U.S. PATENT DOCUMENTS

| 5,462,820 | A |   | 10/1995 | Tanaka |              |
|-----------|---|---|---------|--------|--------------|
| 5,871,866 | A | * | 2/1999  | Barker | ...... 429/231.1 |
| 5,910,382 | A | * | 6/1999  | Goodenough | ........ 429/218.1 |
| 6,136,472 | A | * | 10/2000 | Barker et al. | ...... 429/218.1 |
| 6,514,640 | B1 | * | 2/2003 | Armand et al. | ......... 429/231.1 |
| 6,730,281 | B1 | * | 5/2004 | Barker et al. | ............ 423/306 |
| 6,746,799 | B1 | * | 6/2004 | Yamada et al. | ............ 429/221 |
| 6,749,967 | B1 | * | 6/2004 | Li et al. | ............ 429/231.95 |
| 2003/0129492 | A1 | * | 7/2003 | Barker et al. | ............ 429/221 |

FOREIGN PATENT DOCUMENTS

| JP | 63-125188 | * | 11/1989 |
| WO | 9740541 |   | 10/1997 |

OTHER PUBLICATIONS

Andersson et al., Thermal Stability of LiFePO$_4$-Based Cathodes, *Electrochemical and Solid-State Letters*, 3 (2) 66-68 (2000).

* cited by examiner

*Primary Examiner*—Mark Ruthkosky
(74) *Attorney, Agent, or Firm*—Sonnenschein Nath & Rosenthal LLP

(57) ABSTRACT

A cell in which liquid leakage or destruction may be prevented as the apparent energy density per unit volume of the cell is maintained. The cell uses, as a cathode active material, a compound of an olivinic crystal structure having the formula $Li_xFe_{1-y}M_yPO_4$, where M is at least one selected from the group of Mn, Cr, Co, Cu, Ni, V, Mo, Ti, Zn, Al, Ga, Mg, B and Nb, with $0.05 \leq x \leq 1.2$ and $0 \leq y \leq 0.8$. By adjusting the amount of the electrolyte solution, the amount of the void in the container is set so as to be not less than 0.14 cc and not more than 0.3 cc per 1 Ah of the cell capacity.

13 Claims, 1 Drawing Sheet

NON-AQUEOUS ELECTROLYTE SECONDARY CELL WITH A LITHIUM METAL PHOSPHATE CATHODE

RELATED APPLICATION DATA

The present application claims priority to Japanese Application(s) No(s). P2000-308302 filed Oct. 6, 2000, which application(s) is/are incorporated herein by reference to the extent permitted by law.

BACKGROUND OF THE INVENTION

1. Field of the Invention

This invention relates to a non-aqueous electrolyte secondary cell employing a so-called olivinic lithium phosphorus oxide as a cathode active material.

2. Description of Related Art

Nowadays, in keeping up with the recent marked progress in the electronic equipment, researches into re-chargeable secondary cells, as power sources usable conveniently and economically for prolonged time, are underway. Representative of the secondary cells are lead accumulators, alkali accumulators and non-aqueous electrolyte secondary cells.

Of the above secondary cells, lithium ion secondary cells, as non-aqueous electrolyte secondary cells, have such merits as high output and high energy density.

The lithium ion secondary cells are made up of a cathode and an anode, including active materials capable of reversibly doping/undoping lithium ions, and a non-aqueous electrolyte. The charging reaction of the lithium ion secondary cell proceeds as lithium ions are deintercalated into an electrolyte solution at the cathode and are intercalated into the anode active material. In discharging, reaction opposite to that of the charging reaction proceeds, such that lithium ions are interecalated at the cathode. That is, charging/discharging is repeated as the reaction of entrance/exiting of lithium ions from the cathode into the anode active material and from the anode active material occurs repeatedly.

As the cathode active material of the lithium ion secondary cell, $LiCoO_2$, $LiNiO_2$ or $LiMn_2O_4$ is used because these materials have a high energy density and a high cell voltage.

In a non-aqueous electrolyte secondary cell, employing a lithium composite oxide and a carbonaceous material as a cathode active material and as an anode active material, respectively, leakage of the electrolyte solution or cell destruction is produced due to rise in the internal pressure caused by gases generated by the reaction between the cathode and the electrolyte solution during charging/discharging.

For combating these inconveniences, it is necessary to provide a void in the cell container. However, if such a void is to be provided, the amount of the active material that can be accommodated in the container needs to be diminished, thus lowering the apparent volumetric energy density of the cell.

SUMMARY OF THE INVENTION

It is therefore an object of the present invention to provide a non-aqueous electrolyte secondary cell in which the void in the cell container is reduced to the smallest value possible to keep the apparent energy density per unit volume of the cell, and in which leakage of the electrolyte solution or destruction of the cell may be prevented from occurring.

The present inventors have conducted a variety of investigations and have arrived at the information that, by employing an olivinic type lithium phosphorus oxide as a cathode active material, gas generation can be suppressed, such that, even if the amount of the void is set to a value smaller than a value used up to now, liquid leakage or cell destruction may be prevented from occurring.

The present invention is completed based on this information and provides a non-aqueous electrolyte secondary cell including a cathode employing a cathode active material containing a compound of the olivinic structure having the formula $Li_xFe_{1-y}M_yPO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, an anode and an electrolyte solution in which the cathode, anode and the electrolyte solution are housed in a container. The amount of said electrolyte solution is adjusted to provide a void in the container of not less than 0.14 cc and not larger than 0.3 cc per 1 Ah of the cell capacity.

With the aforementioned olivinic type lithium phosphorus oxide, the voltage is set to a lower value than with the conventional cathode active material, such as $LiCoO_2$, and moreover the oxygen atom (O) is strongly covalently bonded to the phosphorus atom (P). So, the aforementioned olivinic type lithium phosphorus oxide is lower in reactivity to the electrolyte solution, while suffering from gas generation to only a limited extent.

Thus, by using the olivinic type lithium phosphorus oxide as the cathode active material, the amount of the void may be set to a smaller value than a value used up to now, such as to improve the volumetric energy density. Moreover, there is no risk of leakage of the electrolyte solution or the cell destruction.

That is, according to the present invention, in which the olivinic type lithium phosphorus oxide is used as the cathode active material, and the amount of the void is set so as to be within a preset range, it is possible to evade liquid leakage or cell destruction due to increased internal pressure, as the amount of the void in the cell container is reduced to as small a value as possible to maintain the apparent volumetric energy density of the cell, while it is also possible to realize sufficient strength against e.g., vibrations.

DESCRIPTION OF THE PREFERRED EMBODIMENTS

Figure 1:
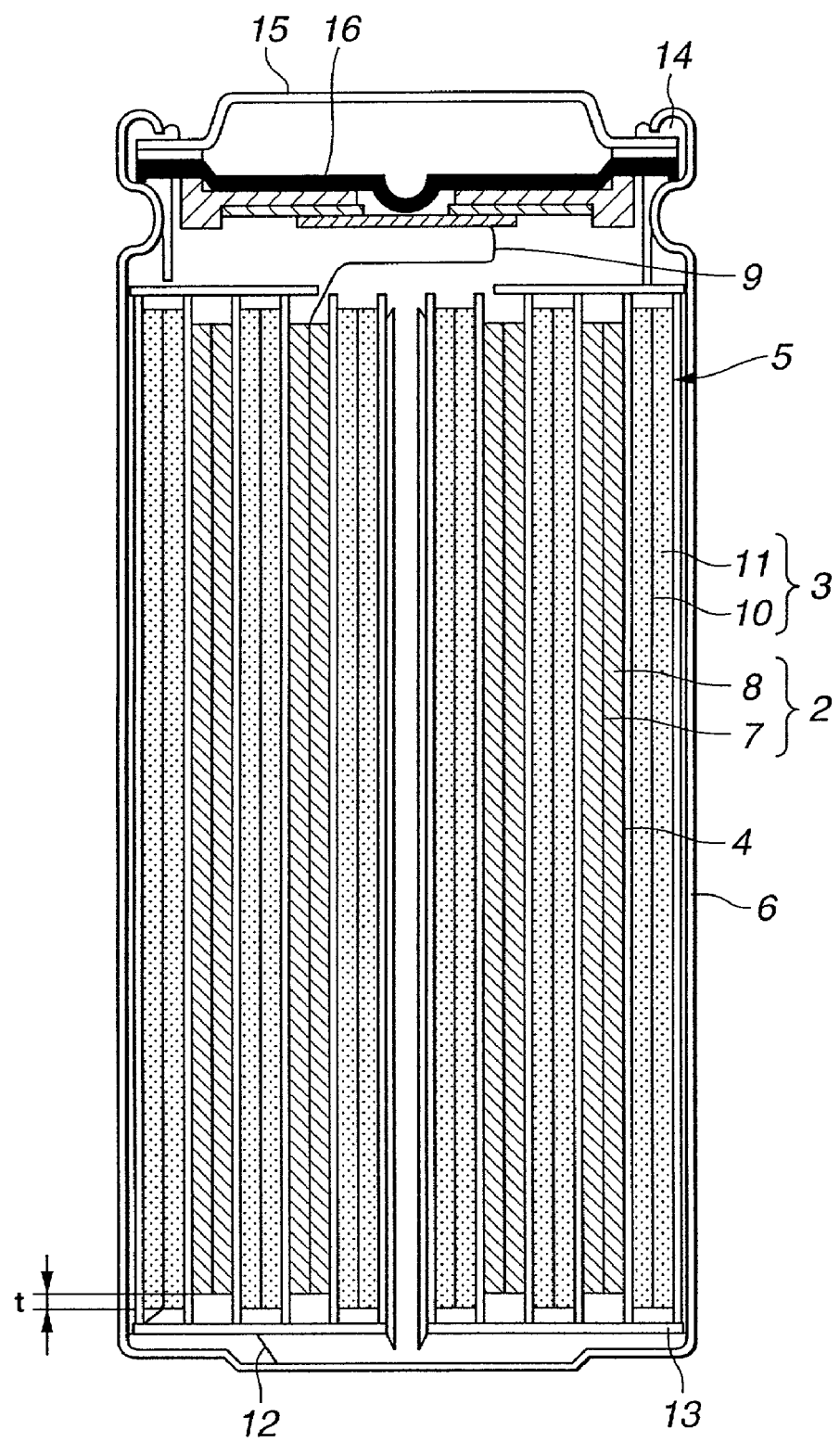
FIG. 1 is a schematic cross-sectional view showing an illustrative structure of a non-aqueous electrolyte secondary cell.

Referring to the drawings, a non-aqueous electrolyte secondary cell according to the present invention will be explained in detail.

Referring to FIG. 1, a non-aqueous electrolyte secondary cell 1 includes a strip-shaped cathode material 2 and a strip-shaped anode material 3, layered together via a separator 4, and spirally coiled a plural number of times to form a cell device 5, which is housed along with the non-aqueous electrolyte solution in a cell can 6.

The cathode material 2 is made up of a cathode current collector, formed e.g., by an aluminum foil 7, on both sides of which are formed layers of a cathode active material 8 containing a cathode active material capable of reversibly electrically emitting and occluding lithium. A cathode lead 9 is mounted in the vicinity of one end of the cathode material 2.

The cathode active material contained in the layers of the cathode active material 8 is a compound of an olivinic crystal structure having the formula $Li_xFe_{1-y}M_yPO_4$ where m denotes at least one of Mn, Cr, Co, Cu, Ni, V, Mo, Ti, Zn, Al, Ga, Mg, B and Nb, with $0.05 \leq x \leq 1.2$ and $0 \leq y \leq 0.8$. This compound may be used either alone or in combination.

In the present embodiment, a composite material composed of $LiFePO_4$ as later explained and a carbon material is used as a cathode active material.

In the following, a case of using $LiFePO_4$ as $Li_xFe_{1-y}M_yPO_4$ and of using a composite material of $LiFePO_4$ and a carbon material as cathode active material is explained.

The composite material of $LiFePO_4$ and a carbon material, referred to below simply as $LiFePO_4$ carbon composite material, is such a material composed of $LiFePO_4$ particles on the surfaces of which are attached numerous particles of the carbon material having the particle size appreciably smaller than the particle size of the $LiFePO_4$ particles. Since the carbon material is electrically conductive, the $LiFePO_4$ carbon composite material, composed of the carbon material and $LiFePO_4$, is higher in electronic conductivity than a cathode active material composed e.g., only of $LiFePO_4$. That is, since the $LiFePO_4$ carbon composite material is improved in electronic conductivity due to the carbon particles attached to the $LiFePO_4$ particles, the capacity proper to $LiFePO_4$ can be sufficiently manifested. Thus, by using the $LiFePO_4$ carbon composite material as the cathode active material, the non-aqueous electrolyte secondary cell 1 having a high capacity can be achieved.

The carbon content per unit weight in the $LiFePO_4$ carbon composite material is desirably not less than 3 wt %. If the carbon content per unit weight of the $LiFePO_4$ carbon composite material is less than 3 wt %, the amount of carbon particles attached to $LiFePO_4$ may be insufficient so that no favorable effect in improving the electronic conductivity may be realized satisfactorily.

As the carbon material forming the $LiFePO_4$ carbon composite material, such a material is preferably used which has an intensity area ratio of diffracted beams appearing at the number of waves of 1570 to 1590 $cm^{-1}$ to the diffracted beams appearing at the number of waves of 1340 to 1360 $cm^{-1}$ in the Raman spectrum of graphite in the Raman spectroscopy, or the ratio A(D/G), equal to 0.3 or higher.

The strength area ratio A(D/G) is defined as being a background-free Raman spectral intensity area ratio A(D/G) of a G-peak appearing at the number of waves of 1570 to 1590 $cm^{-1}$ and a D-peak appearing at the number of waves of 1340 to 1360 $cm^{-1}$ as measured by the Raman spectroscopic method as shown in FIG. 2. The expression "background-free" denotes the state free from noisy portions.

Among the numerous peaks of the Raman spectrum of Gr, two peaks, namely a peak termed a G-peak appearing at the number of waves of 1570 to 1590 $cm^{-1}$ and a peak termed a D-peak appearing at the number of waves of 1340 to 1360 $cm^{-1}$, as discussed above, may be observed. Of these, the D-peak is not a peak inherent in the G-peak, but is a Raman inactive peak appearing when the structure is distorted and lowered in symmetry. So, the D-peak is a measure of a distorted structure of Gr. It is known that the intensity area ratio A(D/G) of the D- and G-peaks is proportionate to a reciprocal of the crystallite size La along the axis a of Gr.

As such carbon material, an amorphous carbon material, such as acetylene black, is preferably employed.

The carbon material having the intensity area ratio A(D/G) not less than 0.3 may be obtained by processing such as comminuting with a pulverizing device. A carbon material having an arbitrary ratio A(D/G) may be realized by controlling the pulverizing time duration.

For example, graphite, as a crystalline carbon material, may readily be destroyed in its structure by a powerful pulverizing device, such as a planetary ball mill, and thereby progressively amorphized, so that the intensity area ratio A(D/G) is concomitantly increased. That is, by controlling the driving time duration of a pulverizing device, such a carbon material having a desired A(D/G) value not less than 0.3 may readily be produced. Thus, subject to pulverization, a crystalline carbon material may also be preferably employed as a carbon material.

The powder density of the $LiFePO_4$ carbon composite material is preferably not less than 2.2 $g/cm^3$. If the material for synthesis of the $LiFePO_4$ carbon composite material is milled to such an extent that the powder density is not less than 2.2 $g/cm^3$, the resulting $LiFePO_4$ carbon composite material is comminuted sufficiently so that a non-aqueous electrolyte secondary cell 1 having a higher charging ratio of the cathode active material and a high capacity may be realized. Moreover, since the $LiFePO_4$ carbon composite material is comminuted to satisfy the aforementioned powder density, its specific surface may be said to be increased. That is, a sufficient contact area may be maintained between $LiFePO_4$ and the carbon material to improve the electronic conductivity.

If the powder density of the $LiFePO_4$ carbon composite material is less than 2.2 $g/cm^3$, the $LiFePO_4$ carbon composite material is not compressed sufficiently, so that there is a risk that the packing ratio of the active material cannot be improved at the cathode 2.

On the other hand, the Bulnauer Emmet Teller (BET) specific surface area in the $LiFePO_4$ carbon composite material is preferably not less than 10.3 $m^2/g$. If the BET specific surface area of the $LiFePO_4$ carbon composite material is not less than 10.3 $m^2/g$, the surface area of $LiFePO_4$ per unit weight can be sufficiently increased to increase the contact area between $LiFePO_4$ and the carbon material to improve the electronic conductivity of the cathode active material satisfactorily.

The primary particle size of the $LiFePO_4$ carbon composite material is preferably not larger than 3.1 μm. By the primary particle size of the $LiFePO_4$ carbon composite material being not larger than 3.1 μm, the surface area of $LiFePO_4$ per unit area may be sufficiently increased to increase the contact area between $LiFePO_4$ and the carbon material to improve the electronic conductivity of the cathode active material.

In the present embodiment, the $LiFePO_4$ carbon composite material is used as the cathode active material. However, the present invention is not limited thereto. In the present invention, $LiFePO_4$ by itself may be used as the cathode active material, or a compound having the formula $Li_xFe_{1-y}M_yPO_4$ of the olivinic structure and which is different from $LiFePO_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $0 \leq y \leq 0.8$, may be used as the cathode active material either singly or in combination with other materials. These compounds may be enumerated by, for example, $LiFe_{0.2}Mn_{0.8}PO_4$, $LiFe_{0.2}Cr_{0.8}PO_4$, $LiFe_{0.2}Co_{0.8}PO_4$, $LiFe_{0.2}Cu_{0.8}PO_4$, $LiFe_{0.2}Ni_{0.8}PO_4$, $LiFe_{0.25}V_{0.75}PO_4$, $LiFe_{0.25}Mo_{0.75}PO_4$, $LiFe_{0.25}Ti_{0.75}PO_4$, $LiFe_{0.3}Zn_{0.7}PO_4$, $LiFe_{0.3}Al_{0.7}PO_4$, $LiFe_{0.3}Ga_{0.7}PO_4$, $LiFe_{0.25}Mg_{0.75}PO_4$, $LiFe_{0.25}B_{0.75}PO_4$, and $LiFe_{0.25}Nb_{0.75}PO_4$.

The binder contained in the layer of the cathode active material may be formed of any suitable known resin material routinely used as the binder for the layer of the cathode active material for this sort of the non-aqueous electrolyte cell.

An anode material 3 is made up of an anode current collector 10, formed e.g., by a nickel foil or a copper foil, and a layer of an anode active material 11 formed on each surface of the anode current collector 10. An anode lead 12 is mounted to the vicinity of the anode material 3.

The anode active material of the layer of the anode active material 11 is such a material capable of doping/undoping lithium. As thus anode active material, capable of doping/undoping lithium, metal lithium, lithium alloys, lithium-doped electrically conductive high molecular materials, carbonaceous materials or layered compounds, such as metal oxides, can be used. The binder contained in the layer of the anode active material 11 may be any suitable known binder routinely used in this sort of the non-aqueous electrolyte secondary cell.

In the non-aqueous electrolyte secondary cell 1, if the width-wise ends of the anode material 3 are coincident with or offset inwardly of the width-wise ends of the cathode material 2, lithium ions tend to be precipitated as metal lithium at both width-wise ends of the anode material 3 to obstruct the charging/discharging reaction. Thus, in the non-aqueous electrolyte secondary cell 1, the anode material 3 is formed to be of a width broader than the cathode material 2. It should be noted that, with $LiFePO_4$ used as the cathode active material, the amount of Li discharged during charging/discharging is lesser than with e.g., $LiCoO_2$, such that the amount of metal lithium precipitated is decreased. Thus, if one end of the anode material 3 is larger by 0.05 mm or more than the corresponding end of the cathode material 2, charging/discharging may proceed without being influenced by precipitated metal lithium, whereas, if the one end of the anode material 3 is larger by less than 0.05 mm than the corresponding end of the cathode material 2, the end of the anode material 3 tends to be coincident with or inwardly offset with respect to the corresponding end of the cathode material 2. If the width at one end of the anode material 3 is larger by 2.0 mm or more than the that at the corresponding end of the cathode material 2, the amount of the anode active material not contributing to the cell reaction is increased to lower the energy density of the cell. It is therefore desirable that the anode material 3 is broader in width than the cathode material 2 so that a difference t in the width-wise dimension on one side shown in FIG. 1 will be in a range of 0.05 mm to 0.2 mm.

The separator 4 serves for separating the layer of the cathode active material 8 of the cathode material 2 from the layer of the anode active material 11 of the anode material 3, and may be formed by a film of any suitable known material routinely used as a separator for this sort of the non-aqueous electrolyte secondary cell, such as, for example, a film of a high molecular material, e.g., polypropylene. The separator 4 needs to be as thin in thickness as possible in view of the relation between the lithium ion conductivity and the energy density. Specifically, the separator thickness of, for example, 50 μm or less, is desirable.

In the non-aqueous electrolyte secondary cell 1, the aforementioned cathode material 2 and the anode material 3 are layered together via separator 4, and coiled a plural number of times to form the cell device 5.

As the non-aqueous electrolyte solution, such a solution obtained on dissolving an electrolyte in a non-protonic aqueous solvent is used.

As the non-aqueous solvent, propylene carbonate, ethylene carbonate, butylene carbonate, vinylene carbonate, γ-butyrolactone, sulforane, 1,2-dimethoxyethane, 1,2-diethoxyethane, 2-methyl tetrahydrofuran, 3-methyl-1,3-dioxolane, methyl propionate, methyl butyrate, dimethyl carbonate, diethyl carbonate and dipropyl carbonate, for example, may be used. In view of voltage stability, cyclic carbonates, such as propylene carbonate, ethylene carbonate, butylene carbonate or vinylene carbonate, and chained carbonates, such as dimethyl carbonate, diethyl carbonate and dipropyl carbonate, are preferably used. These non-aqueous solvents may be used alone or in combination.

As the electrolytes dissolved in the non-aqueous solvent, lithium salts, such as $LiPF_6$, $LiClO_4$, $LiAsF_6$, $LiBF_4$, $LiCF_3SO_3$ or $LiN(CF_3SO_2)_2$, may be used. Of these lithium salts, $LiPF_6$ and $LiBF_4$ are preferred.

The cell can 6, the inner surface of which is plated with nickel, is used for housing the cell device 5 and the non-aqueous electrolyte.

According to the present invention, the amount of the non-aqueous electrolyte solution charged or the electrode width is adjusted to control the void in the container 6. Specifically, the amount of the void is set so as to range between 0.14 cc and 0.3 cc per 1 Ah capacity.

If the olivinic lithium phosphorus oxide is used as a cathode active material, the amount of the gas generated with the reaction is only small, such that, if the void is set to 0.14 cc per 1 Ah capacity which is a value smaller than the routinely used value, the function as a buffer is performed. However, if the void is less than 0.14 cc, it becomes difficult to evade leakage of the electrolyte solution or cell destruction reliably.

On the other hand, if the void exceeds 0.3 cc, the cell is more vulnerable to shock, such as vibrations, while the lowering the energy density per unit cell volume is lowered to detract from the merit of using the olivinic lithium phosphorus oxide as a cathode active material.

The method for the preparation of the non-aqueous electrolyte cell 1, constructed as described above, is hereinafter explained.

First, a composite material of $LiFePO_4$ and the carbon material, as a cathode active material, is synthesized by a manufacturing method as now explained.

For synthesizing the cathode active material, $LiFePO_4$ as a starting material for synthesis is kneaded together, milled and sintered. At an optional time point in the course of the mixing, milling and sintering, a carbon material is added to the kneaded starting materials for synthesis. As the $LiFePO_4$ starting materials for synthesis, $Li_3PO_4$, $Fe_3(PO_4)_2$ or a hydrate $Fe_3(PO_4)_2 \cdot nH_2O$ thereof, where n denotes the number of hydrates, are used.

In the following, such a case is explained in which lithium phosphate $Li_3PO_4$ and a hydrate $Fe_3(PO_4)_2 \cdot 8H_2O$ thereof, synthesized as explained below, are used as starting materials for synthesis, and in which, after adding a carbon material to these starting materials for synthesis, a number of process steps are carried out to synthesize the $LiFePO_4$ carbon composite material.

First, the $LiFePO_4$ starting materials for synthesis and the carbon material are mixed together to form a mixture by way of a mixing step. The mixture from the mixing step is then milled by a milling process, and the milled mixture then is fired by way of performing a sintering process.

In the mixing process, lithium phosphate and iron phosphate I octahydrate are mixed together at a pre-set ratio and further added to with a carbon material to form a mixture.

This iron phosphate I octahydrate, used as a starting material for synthesis, is synthesized by adding disodium hydrogen phosphate dodecahydrate $(2Na_2HPO_4 \cdot 12H_2O)$ to an aqueous solution obtained on dissolving iron phosphate heptahydrate ($FeSO_4 \cdot 7H_2O$) in water and by allowing the resulting mass to dwell for a pre-set time. The reaction of synthesis of iron phosphate I octahydrate may be represented by the following chemical formula (1):

$$3FeSO_4 \cdot 7H_2O + 2Na_2HPO_4 \cdot 12H_2O \rightarrow Fe_3(PO_4)_2 \cdot 8H_2O + 2Na_2SO_4 + 37H_2O \quad (1).$$

In iron phosphate I octahydrate, as the material for synthesis, there is contained a certain amount of $Fe^{3+}$ from the synthesis process. If $Fe^{3+}$ is left in the material for synthesis, a trivalent Fe compound is generated by sintering to obstruct single-phase synthesis of the $LiFePO_4$ carbon composite material. It is therefore necessary to add a reducing agent to the starting materials for synthesis prior to sintering and to reduce $Fe^{3+}$ contained in the starting materials for synthesis to $Fe^{2+}$ at the time of firing.

However, there is a limitation to the capability of the reducing agent in reducing $Fe^{3+}$ to $Fe^{2+}$ by the reducing agent, such that, if the content of $Fe^{3+}$ in the starting materials for synthesis is excessive, it may be an occurrence that $Fe^{3+}$ is not reduced in its entirety but is left in the $LiFePO_4$ carbon composite material.

It is therefore desirable that the content of $Fe^{3+}$ in the total iron in the iron phosphate I octahydrate be set to 61 wt % or less. By limiting the content of $Fe^{3+}$ in the total iron in the iron phosphate I octahydrate to 61 wt % or less from the outset, single-phase synthesis of the $LiFePO_4$ carbon composite material can be satisfactorily achieved without allowing $Fe^{3+}$ to be left at the time of firing, that is without generating impurities ascribable to $Fe^{3+}$.

It should be noted that, the longer the dwell time in generating iron phosphate I octahydrate, the larger becomes the content of $Fe^{3+}$ in the generated product, so that, by controlling the dwell time so as to be equal to a preset time, iron phosphate I octahydrate having an optional $Fe^{3+}$ can be produced. The content of $Fe^{3+}$ in the total iron in the iron phosphate I octahydrate can be measured by the Mossbauer method.

The carbon material added to the starting materials for synthesis acts as a reducing agent for reducing $Fe^{3+}$ to $Fe^{2+}$, at the time of sintering, even if $Fe^{2+}$ contained in iron phosphate I octahydrate as the starting materials for synthesis is oxidized to $Fe^{3+}$ by oxygen in atmosphere or due to sintering. Therefore, even if $Fe^{3+}$ is left in the starting materials for synthesis, impurities may be prevented from being generated to assure single-phase synthesis of the $LiFePO_4$ carbon composite material. Moreover, the carbon material acts as an antioxidant for preventing oxidation of $Fe^{2+}$ contained in the starting materials for synthesis to $Fe^{3+}$. That is, the carbon material prevents oxidation to $Fe^{3+}$ of $Fe^{2+}$ by oxygen present in atmosphere and in a firing oven prior to or during sintering.

That is, the carbon material acts not only as an electrification agent for improving the electronic conductivity of the cathode active material but also as a reducing agent and as an antioxidant. Meanwhile, since this carbon material is a component of the $LiFePO_4$ carbon composite material, there is no necessity of removing the carbon material following synthesis of the $LiFePO_4$ carbon composite material. The result is the improved efficiency in the preparation of the $LiFePO_4$ carbon composite material.

It is noted that the carbon content per unit weight of the $LiFePO_4$ carbon composite material be not less than 3 wt %. By setting the carbon content per unit weight of the $LiFePO_4$ carbon composite material to not less than 3 wt %, it is possible to utilize the capacity and cyclic characteristics inherent in $LiFePO_4$ to its fullest extent.

In the milling process, the mixture resulting from the mixing process is subjected to milling in which pulverization and mixing occur simultaneously. By the milling herein is meant the powerful comminuting and mixing by a ball mill. As the ball mill, a planetary ball mill, a shaker ball mill or a mechano-fusion may selectively be employed.

By milling the mixture from the mixing process, the starting materials for synthesis and the carbon material can be mixed homogeneously. Moreover, if the starting materials for synthesis is comminuted by milling, the specific surface area of the starting materials for synthesis can be increased, thereby increasing the contact points of the starting materials for synthesis to accelerate the synthesis reaction in the subsequent sintering process.

It is desirable that, by milling the mixture containing the starting materials for synthesis, the particle size distribution of the particle size not less than 3 μm be not larger than 22% in terms of the volumetric integration frequency. With the particle size distribution of the starting materials for synthesis in the above range, the starting materials for synthesis has a surface area sufficient to produce surface activity for carrying out the synthesis reaction. Thus, even if the sintering temperature is of a low value of e.g., 600° C. which is lower than the melting point of the starting materials for synthesis, the reaction efficiency is optimum, thus realizing the single-phase synthesis of the $LiFePO_4$ carbon composite material satisfactorily.

Moreover, the milling is desirably executed so that the powder density of the $LiFePO_4$ carbon composite material will be 2.2 g/cm³ or higher. By comminuting the starting materials for synthesis to give the above defined powder density, the specific surface area of $LiFePO_4$ and hence the contact area between $LiFePO_4$ and the carbon material can be increased to improve the electronic conductivity of the cathode active material.

Thus, by milling the mixture containing the starting material for synthesis, such a cathode active material can be produced which will give a high capacity non-aqueous electrolyte secondary cell 1.

In the sintering step, the mixture obtained on compaction in the compression step is sintered. By sintering the mixture, lithium phosphate may be reacted with iron phosphate I octahydrate to synthesize $LiFePO_4$.

The synthesis reaction of $LiFePO_4$ may be represented by the following reaction formula (2):

$$Li_3PO_4 + Fe_3(PO_4)_2 \cdot nH_2O \rightarrow 3\, LiFePO_4 + nH_2O \quad (2)$$

where n denotes the number of hydrates and is equal to 0 for an anhydride. In the chemical formula (2), $Li_3PO_4$ is reacted with $Fe_3(PO_4)_2$ or its hydrate $Fe_3(PO_4)_2 \cdot nH_2O$ where n denotes the number of hydrates.

As may be seen from the chemical formula (2), no by-product is yielded if $Fe_3(PO_4)_2$ is used as a starting materials for synthesis. On the other hand, if $Fe_3(PO_4)_2 \cdot nH_2O$ is used, water, which is non-toxic, is by-produced.

Heretofore, lithium carbonate, ammonium dihydrogen phosphate and iron acetate II, as syntheses materials, are mixed at a pre-set ratio and sintered to synthesize $LiFePO_4$ by the reaction shown by the chemical formula (3):

$$Li_2CO_3 + 2Fe(CH_3COO)_2 + 2NH_4H_2PO_4 \rightarrow 2LiFePO_4 + CO_2 + H_2O + 2NH_3 + 4CH_3COOH \quad (3)$$

As may be seen from the reaction formula, toxic by-products, such as ammonia or acetic acid, are generated on sintering with the conventional synthesis method for LiFePO$_4$. So, a large-scale equipment, such as gas collector, is required for processing these toxic by-products, thus raising the cost. In addition, the yield of LiFePO$_4$ is lowered because these by-products are generated in large quantities.

In the present non-aqueous electrolyte secondary cell 1, in which Li$_3$PO$_4$, Fe$_3$(PO$_4$)$_2$ or its hydrate Fe$_3$(PO$_4$)$_2$·nH$_2$O, where n denotes the number of hydrates, is used as the starting material for synthesis, the targeted LiFePO$_4$ can be produced without generating toxic by-products. In other words, safety in sintering may be appreciably improved as compared to the conventional manufacturing method. Moreover, while a large-scale processing equipment is heretofore required for processing toxic by-products, the manufacturing method of the present invention yields only water, which is innoxious, as a by-product, thus appreciably simplifying the processing step to allow to reduce size of the processing equipment. The result is that the production cost can be appreciably lower than if ammonia etc which has to be processed is by-produced in the conventional system. Moreover, since the by-product is yielded only in minor quantities, the yield of LiFePO$_4$ may be improved significantly.

Although the sintering temperature in sintering the mixture may be 400 to 900° C. by the above synthesis method, it is preferably 600° C. or thereabouts in consideration of the cell performance. If the sintering temperature is less than 400° C., neither the chemical reaction nor crystallization proceeds sufficiently such that the phase of impurities such as Li$_3$PO$_4$ of the starting materials for synthesis may persist and hence the homogeneous LiFePO$_4$ may not be produced. If conversely the sintering temperature exceeds 900° C., crystallization proceeds excessively so that the LiFePO$_4$ particles are coarse in size to decrease the contact area between LiFePO$_4$ and the carbon material to render it impossible to achieve sufficient discharging capacity.

During sintering, Fe in the LiFePO$_4$ carbon composite material synthesized is in the bivalent state. So, in the temperature of the order of 600° C. as the synthesis temperature, Fe in the LiFePO$_4$ carbon composite material is promptly oxidized to Fe$^{3+}$ by oxygen in the sintering atmosphere in accordance with the chemical formula shown by the chemical formula (4):

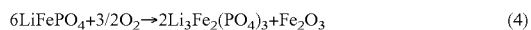

$$6LiFePO_4 + 3/2O_2 \rightarrow 2Li_3Fe_2(PO_4)_3 + Fe_2O_3 \quad (4)$$

so that impurities such as trivalent Fe compounds are produced to obstruct the single-phase synthesis of the LiFePO$_4$ carbon composite material.

So, inert gases, such as nitrogen or argon, or reducing gases, such as hydrogen or carbon monoxide, are used as the sintering atmosphere, while the oxygen concentration in the sintering atmosphere is prescribed to a range within which Fe in the LiFePO$_4$ carbon composite material is not oxidized, that is to not larger than 1012 ppm (volume). By setting the oxygen concentration in the sintering atmosphere to 1012 ppm (volume) or less, it is possible to prevent Fe from being oxidized even at the synthesis temperature of 600° C. or thereabouts to achieve the single-phase synthesis of the LiFePO$_4$ carbon composite material.

If the oxygen concentration in the sintering atmosphere is 1012 ppm in volume or higher, the amount of oxygen in the sintering atmosphere is excessive, such that Fe in the LiFePO$_4$ carbon composite material is oxidized to Fe$^{3+}$ to generate impurities to obstruct the single-phase synthesis of the LiFePO$_4$ carbon composite material.

As for takeout of the sintered LiFePO$_4$ carbon composite material, the takeout temperature of the sintered LiFePO$_4$ carbon composite material, that is the temperature of the LiFePO$_4$ carbon composite material exposed to atmosphere, is desirably 305° C. or lower. On the other hand, the takeout temperature of the sintered LiFePO$_4$ carbon composite material is more desirably 204° C. or lower. By setting the takeout temperature of the LiFePO$_4$ carbon composite material to 305° C. or lower, Fe in the sintered LiFePO$_4$ carbon composite material is oxidized by oxygen in atmosphere to prevent impurities from being produced.

If the sintered LiFePO$_4$ carbon composite material is taken out in an insufficiently cooled state, Fe in the LiFePO$_4$ carbon composite material is oxidized by oxygen in atmosphere, such that impurities tend to be produced. However, if the LiFePO$_4$ carbon composite material is cooled to too low a temperature, the operating efficiency tends to be lowered.

Thus, by setting the takeout temperature of the sintered LiFePO$_4$ carbon composite material to 305° C. or lower, it is possible to prevent Fe in the sintered LiFePO$_4$ carbon composite material from being oxidized by oxygen in atmosphere and hence to prevent impurities from being generated to maintain the operation efficiency as well as to synthesize the LiFePO$_4$ carbon composite material having desirable cell characteristics with high efficiency.

Meanwhile, the cooling of the as-sintered LiFePO$_4$ carbon composite material is carried out in a sintering furnace. The cooling method used may be spontaneous cooling or by forced cooling. However, if a shorter cooling time, that is a higher operating efficiency, is envisaged, forced cooling is desirable. In case the forced cooling is used, it is sufficient if a gas mixture of oxygen and inert gases, or only the inert gases, are supplied into the sintering furnace so that the oxygen concentration in the sintering furnace will be not higher than the aforementioned oxygen concentration, that is, 1012 ppm (volume) or less.

In the above, the carbon material is added prior to the milling step. Alternatively, the carbon material may also be added after the milling step or after the sintering step.

However, if the carbon material is added after the sintering step, the reducing effect or the oxidation preventative effect during sintering cannot be obtained, such that the addition is useful only for improving the electrical conductivity. Thus, in case the carbon material is added after the sintering step, it becomes necessary to prevent Fe$^{3+}$ from being left over by other suitable measures.

It is noted that, if the carbon material is added after the sintering step, the product synthesized on sintering is not the LiFePO$_4$ carbon composite material but is LiFePO$_4$. So, milling is again applied after the carbon material is added to LiFePO$_4$ synthesized on sintering. By this second milling, the carbon material added is comminuted and hence is more liable to become attached to the surface of LiFePO$_4$. Moreover, by this second milling, LiFePO$_4$ and the carbon material are mixed sufficiently to permit the comminuted carbon material to be attached uniformly to the surface of LiFePO$_4$. So, even in case the carbon material is added after sintering, it is possible to obtain a product similar to one obtained on addition of a carbon material prior to milling, that is the LiFePO$_4$ carbon composite material, as well as to achieve the favorable effect similar to that described above.

A non-aqueous electrolyte cell 1, employing the LiFePO$_4$ carbon composite material, produced as described above, as the cathode active material, is prepared e.g., as follows:

As the cathode material 2, the LiFePO$_4$ carbon composite material as the cathode active material and a binder are dispersed in a solvent to prepare a slurried cathode mixture. The so produced cathode mixture is evenly coated on the cathode current collector 7 and dried in situ to form the layer of the cathode active material 8 to prepare the cathode material 2. As the binder for the cathode mixture, any suitable known binder may be used. Alternatively, any suitable known binder may be added to the aforementioned cathode mixture.

In the present embodiment, the LiFePO$_4$ carbon composite material is used as the cathode active material. However, the present invention is not limited thereto. In the present invention, LiFePO$_4$ by itself may be used as the cathode active material, or a compound having the formula Li$_x$Fe$_{1-y}$M$_y$PO$_4$ of the olivinic structure and which is different from LiFePO$_4$, where M is at least one selected from the group consisting of Mn, Cr, Co, Cu, Ni, V, Mo, Ti, Zn, Al, Ga, Mg, B and Nb, with $0.05 \leq x \leq 1.2$ and $2.0 \leq y \leq 0.8$, may be used as the cathode active material either singly or in combination with other materials. These compounds may be enumerated by, for example, LiFe$_{0.2}$Mn$_{0.8}$PO$_4$, LiFe$_{0.2}$Cr$_{0.8}$PO$_4$, LiFe$_{0.2}$Co$_{0.8}$PO$_4$, LiFe$_{0.2}$Cu$_{0.8}$Po$_4$, LiFe$_{0.2}$Ni$_{0.8}$PO$_4$, LiFe$_{0.25}$V$_{0.75}$PO$_4$, LiFe$_{0.25}$Mo$_{0.75}$PO$_4$, LiFe$_{0.25}$Ti$_{0.75}$PO$_4$LiFe$_{0.3}$Zn$_{0.7}$PO$_4$, LiFe$_{0.3}$Al$_{0.7}$PO$_4$, LiFe$_{0.3}$Ga$_{0.7}$PO$_4$, LiFe$_{0.25}$Mg$_{0.75}$PO$_4$, LiFe$_{0.25}$B$_{0.75}$Po$_4$, and LiFe$_{0.25}$Nb$_{0.75}$PO$_4$.

In preparing the anode material 3, the anode active material and the cathode active material are first dispersed in a solvent to form a slurried anode mixture. The so produced anode mixture is evenly coated on the anode current collector and dried in situ to form a layer of the anode active material to prepare the anode material 3. As the binder for the anode mixture, any suitable known binder may be used. Alternatively, any suitable known binder may be added to the anode mixture.

The width-wise dimension of the anode material 3 is selected to be larger than that of the cathode material 2. Preferably, the anode material 3 is formed to be 0.05 to 2.0 mm broader in width than the cathode material 2.

The cathode material 2 and the anode material 3, thus produced, are layered together, via separator 4, and coiled together a plural number of times, to complete the cell device 5.

The non-aqueous electrolyte solution is prepared by dissolving an electrolyte salt in a non-aqueous solvent.

The cell device 5 is housed via insulating plate 13 in a cell can 6 into which the non-aqueous electrolyte solution then is charged. A lid 15 and a safety valve device 16 are caulked together to the cell can 6 via gasket 14 to complete the non-aqueous electrolyte secondary cell 1.

It is noted that the amount of the non-aqueous electrolyte solution to be supplied into the cell can 6 is adjusted so that the amount of the void left in the cell can 6 will be in the aforementioned range of 0.14 to 3.3 cc per 1 Ah.

EXAMPLES

The present invention is now explained with reference to specified Examples based on experimental results.

Example 1

First, a lithium phosphorus oxide (LiFePO$_4$), as a cathode active material, was prepared under the following conditions:

Lithium phosphate and iron oxide II octahydrate were mixed so that the lithium to iron element ratio is 1:1, and acetylene black powders were added in an amount corresponding to 10% of the entire sintered product to yield a sample mixture. This sample mixture was charged into an alumina vessel and milled with a planetary ball mill under the conditions of the sample to alumina ball weight ratio of 50%, rotational velocity of 250 rpm and the driving time of 10 hours. The milled mass then was sintered at 600° C. for five hours in an electrical oven in a ceramic crucible to yield LiFePO$_4$.

Using the so obtained LiFePO$_4$ as cathode active material, LiFePO$_4$ and polyvinylidene fluoride as fluorine resin powders as a binder were mixed at a weight ratio of 95:5 to yield a cathode mixture, which was then dispersed in N-methyl pyrrolidone as a solvent to give a slurried cathode mixture. This slurried cathode mixture was coated evenly on both surfaces of a strip-shaped aluminum foil, which proves a cathode current collector, 20 μm in thickness and 56 mm in width, and was dried in situ. The resulting dried product was compression molded in a roll press to yield a strip-shaped cathode material.

Pulverized pitch coke, used as an anode active material, and polyvinylidene fluoride, as a binder, were mixed together at a weight ratio of 90:10, to prepare an anode mixture, which then was dispersed in N-methyl pyrrolidone as a solvent to form a slurried anode mixture. This slurried anode mixture was coated evenly on both sides of a strip-shaped copper foil, which proves an anode current collector, 10 μm in thickness and 58 mm in width, and was dried in situ. The resulting dried product was compression molded, as in the case of the cathode mixture, in a roll press, to prepare a strip-shaped anode material.

The anode material and the cathode material, thus prepared, are layered, via a pair of separators of micro-porous polypropylene, 25 μm in thickness, in the order of the anode mixture, separator, cathode material and the separator, and wound spirally a plural number of times to form a coil device.

After mounting insulating plates on the upper and lower surfaces of the cell device, prepared as described above, the cell device was housed in a cell can. A cathode lead, mounted on the anode mixture, was derived from the anode material and welded to the cell can. An electrolyte solution obtained on mixing propylene carbonate (PC), with lithium phosphate hexafluoride dissolved therein at a rate of 1 mol/l, and dimethyl carbonate (DMC), at a PC:DMC ratio of 1:1, was fed into the cell can until the separators were wetted sufficiently.

The electrolyte solution was introduced in an amount of 4.1 ml and the void capacity in the cell was set to 0.2 ml.

The cell can and a lid were caulked together via a gasket and sealed together. Such a safety valve as is shut at approximately 5 atm was used.

The capacity of the produced cell was 1.4 Ah so that the void calculated as 1 Ah is 0.14 cc.

Examples 2 and 3 and Comparative Examples 1 and 2

Several cell samples were prepared as the void per 1 Ah was varied as shown in Table 1.

Example 4 and Comparative Example 3

A cell was prepared in the same way as in Example 1 except setting the width of the cathode current collector, that of the anode current collector and the width of the separator to 43 mm, 45 mm, and 47 mm, respectively.

The amount of the non-aqueous electrolyte solution introduced was 3 ml (for Comparative Example 3) to 3.5 ml (Example 4), with the cell capacity being 1.1 Ah.

Of these cells, valve states after ten cycles were checked, and vibration tests were further conducted. As vibration conditions in the vibration tests, the acceleration for vibrations and the vibration time were set to 3.0 G and 25 hours, respectively, with the number of samples for the respective Examples and Comparative Examples being set to 1. The results are shown in Table 1.

TABLE 1

|  | Comp. Ex. 1 | Comp. Ex. 2 | Ex. 1 | Ex. 2 | Ex. 3 | Ex. 4 | Comp. Ex. 3 |
|---|---|---|---|---|---|---|---|
| amount of solution introduced (ml) | 4.3 | 4.2 | 4.1 | 4.0 | 3.3 | 3.5 | 3.0 |
| capacity of void in cell (cc) | 0 | 0.1 | 0.2 | 0.3 | 1.0 | 3.5 | 4.0 |
| proportion to cell capacity (%) | — | 0.6 | 1.2 | 1.8 | 6.0 | 21.2 | 24.2 |
| proportion to device capacity (%) | — | 0.7 | 1.4 | 2.1 | 7.1 | 31.6 | 36.1 |
| valve state after 10 cycles | deformed | deformed | not changed | not changed | not changed | not changed | not changed |
| valve state after 60 days storage after 10 cycles | valve on | deformed | not changed | not changed | not changed | not changed | not changed |
| lead state after vibration test | not changed | not changed | not changed | not changed | not changed | not changed | ruptured |
| void calculated as 1 Ah (cc) | 0 | 0.07 | 0.14 | 0.21 | 0.71 | 3.22 | 3.68 |
| evaluation | X | X | ○ | ○ | ○ | ○ | X |

In the Comparative Examples 1 and 2 where the amount of the void is small, valve deformation occurred. In the respective Examples where the amount of the void calculated as 1 Ah is set to 0.14 or more, no such deformation occurred.

However, in the Comparative Example 3 where the amount of the void calculated as 1 Ah exceeds 0.3 cc, the lead was seen to have ruptured. It is not desirable to provide excess void in the can because the cell then is more vulnerable to shock, such as vibrations.

From the above experimental results, it may be said that the amount of the void calculated as 1 Ah of 0.14 cc to 0.3 cc is desirable.

Cells of Examples 5 to 18, shown below, were fabricated and evaluated as in the previous Examples.

Example 5

A cell was prepared under the same condition as that for the cell of Example 1 except using $LiFe_{0.2}Mn_{0.8}PO_4$ in place of the $LiFePO_4$ carbon composite material.

Example 6

A cell was prepared under the same condition as that for the cell of Example 1 except using $LiFe_{0.2}Cr_{0.8}PO_4$ in place of the $LiFePO_4$ carbon composite material.

Example 7

A cell was prepared under the same condition as that for the cell of Example 1 except using $LiFe_{0.2}Co_{0.8}PO_4$ in place of the $LiFePO_4$ carbon composite material.

Example 8

A cell was prepared under the same condition as that for the cell of Example 1 except using $LiFe_{0.2}Cu_{0.8}PO_4$ in place of the $LiFePO_4$ carbon composite material.

Example 9

A cell was prepared under the same condition as that for the cell of Example 1 except using $LiFe_{0.2}Ni_{0.8}PO_4$ in place of the $LiFePO_4$ carbon composite material.

Example 10

A cell was prepared under the same condition as that for the cell of Example 1 except using $LiFe_{0.25}V_{0.75}PO_4$ in place of the $LiFePO_4$ carbon composite material.

Example 11

A cell was prepared under the same condition as that for the cell of Example 1 except using $LiFe_{0.25}Mo_{0.75}PO_4$ in place of the $LiFePO_4$ carbon composite material.

Example 12

A cell was prepared under the same condition as that for the cell of Example 1 except using $LiFe_{0.25}Ti_{0.75}PO_4$ in place of the $LiFePO_4$ carbon composite material.

Example 13

A cell was prepared under the same condition as that for the cell of Example 1 except using $LiFe_{0.3}Zn_{0.7}PO_4$ in place of the $LiFePO_4$ carbon composite material.

Example 14

A cell was prepared under the same condition as that for the cell of Example 1 except using $LiFe_{0.3}Al_{0.7}PO_4$ in place of the $LiFePO_4$ carbon composite material.

Example 15

A cell was prepared under the same condition as that for the cell of Example 1 except using $LiFe_{0.3}Ga_{0.7}PO_4$ in place of the $LiFePO_4$ carbon composite material.

Example 16

A cell was prepared under the same condition as that for the cell of Example 1 except using $LiFe_{0.25}Mg_{0.75}PO_4$ in place of the $LiFePO_4$ carbon composite material.

Example 17

A cell was prepared under the same condition as that for the cell of Example 1 except using $LiFe_{0.25}B_{0.75}PO_4$ in place of the $LiFePO_4$ carbon composite material.

Example 18

A cell was prepared under the same condition as that for the cell of Example 1 except using $LiFe_{0.25}Nb_{0.75}PO_4$ in place of the $LiFePO_4$ carbon composite material.

In these cell samples, no valve deformation occurred after ten cycles, while the lead state was not changed after the test on vibrations.

In the foregoing explanation of the present invention, the non-aqueous electrolyte secondary cell has a cell device having a cylindrical outer shape and is of the layered and coiled type. The present invention is, however, not limited to this particular configuration and may, of course, be applied to, for example, a rectangular type cell.

What is claimed is:

1. A non-aqueous electrolyte secondary cell comprising:
   a cathode employing a cathode active material containing a compound of the olivinic structure having the formula $Li_xFe_{1-y}M_yPO_4$, wherein M is at least one selected from the group consisting of Zn, Al, Ga, Mg, and, with $0.05 \leq x \leq 1.2$ and $0 \leq y \leq 0.8$, and wherein the cathode has a width;
   an anode having a width; and
   an electrolyte solution; said cathode, anode and the electrolyte solution being housed in a container, wherein the amount of said electrolyte solution is adjusted to provide a void in said container of not less than 0.14 cc and not larger than 0.21 cc per 1 Ah of the cell capacity, and wherein a difference t between the width of the anode and the width of the cathode is 0.05 mm to 0.2 mm.

2. The non-aqueous electrolyte secondary cell according to claim 1 wherein said cathode active material contains a composite material of said compound and a carbon material.

3. The non-aqueous electrolyte secondary cell according to claim 1 wherein said anode contains a carbonaceous material as an anode active material.

4. The non-aqueous electrolyte secondary cell according to claim 1 wherein a strip-shaped cathode material and an anode material are layered together via a separator and are wound a plural number of times to form a cell device, said cell device being housed in a cell can as said container.

5. The non-aqueous electrolyte secondary cell according to claim 4 wherein said cathode material includes a cathode current collector on each side of which a layer of a cathode active material containing a cathode active material is formed and wherein said anode material includes an anode current collector on each side of which a layer of an anode active material containing an anode active material is formed.

6. The non-aqueous electrolyte secondary cell according to claim 5 wherein said layer of the cathode active material is formed of an $LiFePO_4$ carbon composite material composed of said compound and a carbon material.

7. The non-aqueous electrolyte secondary cell according to claim 6 wherein the carbon content per unit volume in said $LiFePO_4$ carbon composite material is not less than 3 wt %.

8. The non-aqueous electrolyte secondary cell according to claim 6 wherein the carbon material of said $LiFePO_4$ carbon composite material has a strength-to-area ratio of a diffraction line appearing at the number of waves of 1570 to 1590 $cm^{-1}$ (G peak) to a diffraction line appearing at the number of waves of 1340 to 1360 $cm^{-1}$ (D peak) of the Raman spectrum in Raman spectrometry, or a (D/G), equal to 0.3 or higher.

9. The non-aqueous electrolyte secondary cell according to claim 6 wherein the powder density of said $LiFePO_4$ carbon composite material is not less than 2.2 $g/cm^3$.

10. The non-aqueous electrolyte secondary cell according to claim 6 wherein the Bullnauer Emmet Teller specific surface is not less than 10.3 $m^2/g$.

11. The non-aqueous electrolyte secondary cell according to claim 6 wherein the first-order particle size of said $LiFePO_4$ carbon composite material is not larger than 3.1 µm.

12. The non-aqueous electrolyte secondary cell according to claim 1 wherein said non-aqueous electrolyte is a non-aqueous electrolyte solution composed of an electrolyte dissolved in a non-aqueous protonic solution.

13. The non-aqueous electrolyte secondary cell according to claim 1 wherein said non-aqueous electrolyte is a solid electrolyte.

* * * * *

UNITED STATES PATENT AND TRADEMARK OFFICE
CERTIFICATE OF CORRECTION

PATENT NO. : 7,122,272 B2
APPLICATION NO. : 09/972375
DATED : October 17, 2006
INVENTOR(S) : Tsuyoshi Okawa et al.

It is certified that error appears in the above-identified patent and that said Letters Patent is hereby corrected as shown below:

In the "Description of the Preferred Embodiments" section of the patent: specification, at Column 5, Line 17, the range:

"0.05 mm to 0.2 mm."

should be

--0.05 mm to 2.0 mm.--

In the Claims of the patent: in Claim 1, at Column 15, line 48, the range:

"0.05 mm to 0.2 mm."

should be

--0.05 mm to 2.0 mm.--

Signed and Sealed this

Thirtieth Day of November, 2010

David J. Kappos
*Director of the United States Patent and Trademark Office*